US006851746B2

(12) United States Patent
Faltings

(10) Patent No.: US 6,851,746 B2
(45) Date of Patent: Feb. 8, 2005

(54) SHOCK-ABSORBING BICYCLE SEAT MOUNT SYSTEM

(76) Inventor: John P. Faltings, P.O. Box 284, Hyde Park, NY (US) 12538

( * ) Notice: Subject to any disclaimer, the term of this patent is extended or adjusted under 35 U.S.C. 154(b) by 0 days.

(21) Appl. No.: 10/429,809

(22) Filed: May 5, 2003

(65) Prior Publication Data

US 2004/0012232 A1 Jan. 22, 2004

Related U.S. Application Data

(60) Division of application No. 09/752,086, filed on Dec. 29, 2000, now Pat. No. 6,631,947, which is a continuation-in-part of application No. 09/253,113, filed on Feb. 19, 1999, now abandoned.

(51) Int. Cl.[7] .................................................. B62J 1/06
(52) U.S. Cl. ................ 297/195.1; 297/209; 297/215.14
(58) Field of Search .............................. 297/195.1, 208, 297/209, 215.14, 211; 248/622, 623

(56) References Cited

U.S. PATENT DOCUMENTS

| | | | | |
|---|---|---|---|---|
| 979,032 A | * | 12/1910 | Pierce | 297/211 |
| 2,467,676 A | * | 4/1949 | Labine | 297/211 |
| 3,796,460 A | * | 3/1974 | Potchen | 297/211 |
| 4,456,295 A | * | 6/1984 | Francu | 297/195.1 |
| 5,062,617 A | * | 11/1991 | Campbell | 267/132 |
| 5,383,705 A | * | 1/1995 | Voigt | 297/195.1 |
| 5,553,880 A | * | 9/1996 | McJunkin et al. | 280/283 |

* cited by examiner

Primary Examiner—Peter R. Brown

(57) ABSTRACT

In a preferred embodiment, a shock-absorbing bicycle seat mount, including a post fixedly attached to a bicycle seat at a proximal end of the post, a distal end of the post being inserted into a bicycle seat tube for axial movement therein; biasing apparatus disposed within the seat tube to support the post; an axial movable platform disposed within the seat tube to support the biasing apparatus and the post; biasing apparatus external of the seat tube disposed to connect the support platform to an upper portion of the seat tube; apparatus to prevent rotational movement of the post within the seat tube; and means to manually fix a minimum height of the post and attached saddle with dis-engagement of the shock-absorbing apparatus at that point.

6 Claims, 5 Drawing Sheets

SHOCK-ABSORBING BICYCLE SEAT MOUNT SYSTEM

CROSS-REFERENCE TO RELATED APPLICATIONS

The present application is a Division of U.S. application Ser. No. 09/752,086, filed Dec. 29, 2000 now U.S. Pat. No. 6,631,947 and titled SHOCK-ABSORBING BICYCLE SEAT MOUNT SYSTEM which is a continuation-in-part of U.S. application Ser. No. 09/253,113 filed Feb. 19, 1999 and titled A SHOCK-ABSORBING BICYCLE SEAT MOUNT SYSTEM, abandoned.

BACKGROUND OF THE INVENTION

1. Field of the Invention

The present invention relates to bicycles generally and, more particularly, but not by way of limitation, to a novel shock-absorbing bicycle seat mount system.

2. Background Art

Ordinarily, bicycle (bike) seats are supported on a post that is tightly clamped in a bike seat tube portion of a bike frame. This is true for movable bicycles and also for stationary, exercise bikes. Seat height location is provided by a certain extension of the seat post upwardly and outwardly from the seat tube. At a post height extension for a particular rider's desired seat height, a clamp located at the top of the tube is tightened to prevent any dislocation movement of the seat post. Thus, the seat post becomes, in effect, integral with the rigid bike frame which ordinarily does not provide for any road mechanical shock absorption other than that absorbed by the bike's inflated rubber tires and front fork shock absorbers when the latter are provided.

A bike rider would experience a more comfortable ride on a seat mount that is free to move in a seat tube with provision for road shock absorption by spring support. It would be desirable therefor, to have a seat post cushioned on a compression spring supported on a platform in the bike seat tube with the platform movably suspended by an external extension spring connected to an upper portion of the bicycle.

A cushioned seat post enabled to move in a quasi-vertical motion along the longitudinal axis of and inside a bicycle seat tube unrestrained by a tightened clamp as described above but restricted as to it's rotational, "swivel", motion is preferentially required for this desired shock-absorbing effect.

Accordingly, it is a principal objective of the present invention to provide a shock-absorbing bicycle seat mount that absorbs imparted road shock.

It is a further objective of the invention to provide such a bicycle seat mount system that conjunctively prevents rotational motion of the bicycle seat mount.

It is yet a further objective of the invention to selectively allow dis-engagement or limitation of the seat mount shock-absorbing effect with manual ease.

It is an additional objective of this invention to provide such a bicycle seat mount system that can either be retro-fitted to an existing bicycle or incorporated in the bicycle at the time of manufacture of the bicycle.

It is another objective of this invention to provide such a bicycle seat mount system that can be economically constructed, easily installed and readily dis-engaged.

Other objectives of the present invention, as well as particular features, elements, and advantages thereof, will be elucidated in, or be apparent from, the following description and the accompanying drawing figures.

SUMMARY OF THE INVENTION

The present invention achieves the above objectives, among others, by providing in a preferred embodiment, a shock-absorbing bicycle seat mount system comprising: a post fixedly attached to a bicycle seat at a proximal end of said post, a distal end of said post being inserted into a bicycle seat tube for axial movement therein; biasing means disposed within said seat tube to support said post; a platform disposed partially within and without said seat tube for axial movement therein and support of said post and said biasing means; biasing means external of said seat tube to suspend said platform and re-direct force loading theron to an upper portion of the seat tube; a seat tube structurally configured to accomodate such shock absorption means and co-operatively prevent rotational movement of said post within said seat tube; and means to dis-engage or limit the bias of the shock-absorbing apparatus.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention on which.

DETAILED DESCRIPTION OF THE PREFERRED EMBODIMENTS

Figure 1:
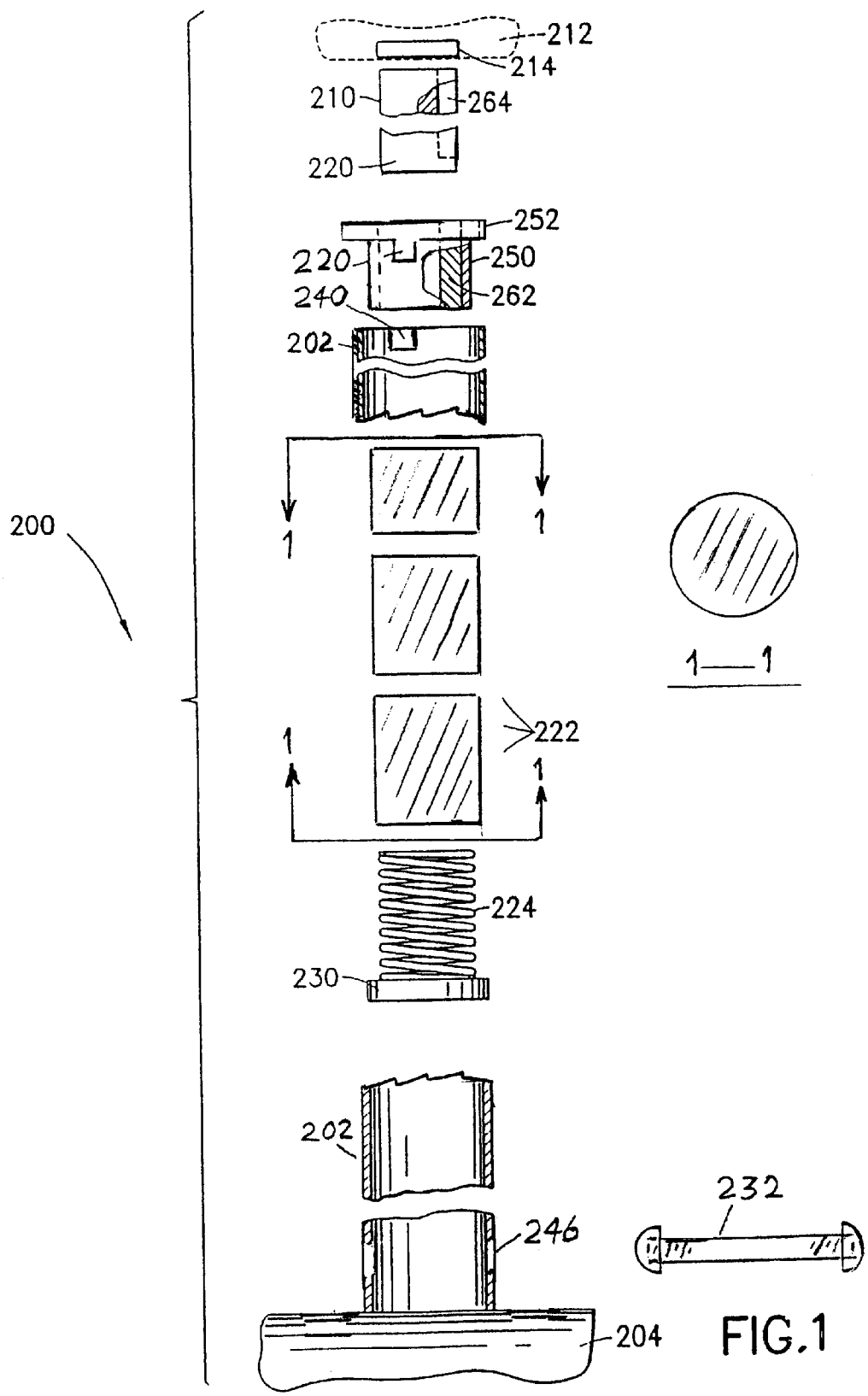
FIG. 1 is an exploded front elevational view, partially in cross section, of a spring cushioned bicycle seat post enabled to move longitudinally but not rotationally in a bicycle seat tube while supported on a platform that is enabled to move longitudinally within and extended out of, the bicycle seat tube.

This is a division of Ser. No. 09/752,086, Filed Dec. 29, 2000.

Reference should now be made to the drawing figures herein, numbered from 1 to 8, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates inner elements of a shock-absorbing bicycle seat mount, generally indicated by the reference numeral 200, constructed to accomodate longitudinal movement of a slotted seat post 210, onto which bicycle saddle 212 is clamped by collar 214 but which is prevented from rotational motion by protrusion 262 that extends inwardly from snug fitting, dimensionally conforming insert 250 into slot 264 of seat post 210. Rotational motion of insert 250 is prevented by tab 220 extending outwardly from the outer wall of 250, depending from flange 252 and protruding into notch 240 of seat tube 202.

Seat post 210, optional spacer blocks 222, biasing means 224 and vibration eliminator wafer 230 are supported on platform 232 which is enabled to move longitudinally in seat tube 202 with it's opposite ends extended through diametrically opposite openings 246 through the wall of seat tube 202.

Figure 2B:
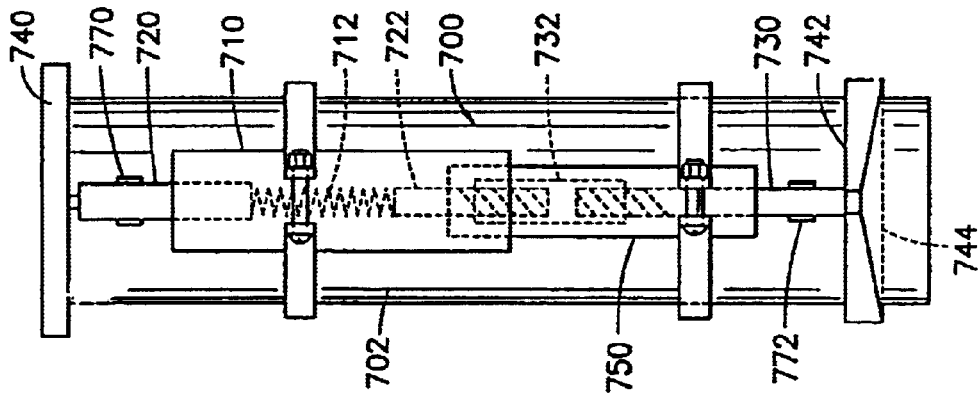
FIGS. 2A and 2B are side elevational and front elevational views, respectively, of one embodiment of an external extension spring linkage apparatus connected to a bicycle seat post's longitudinally movable support platform for shock absorption and transference of it's downward force loading to an upper portion of the seat tube.
Figure 2A:
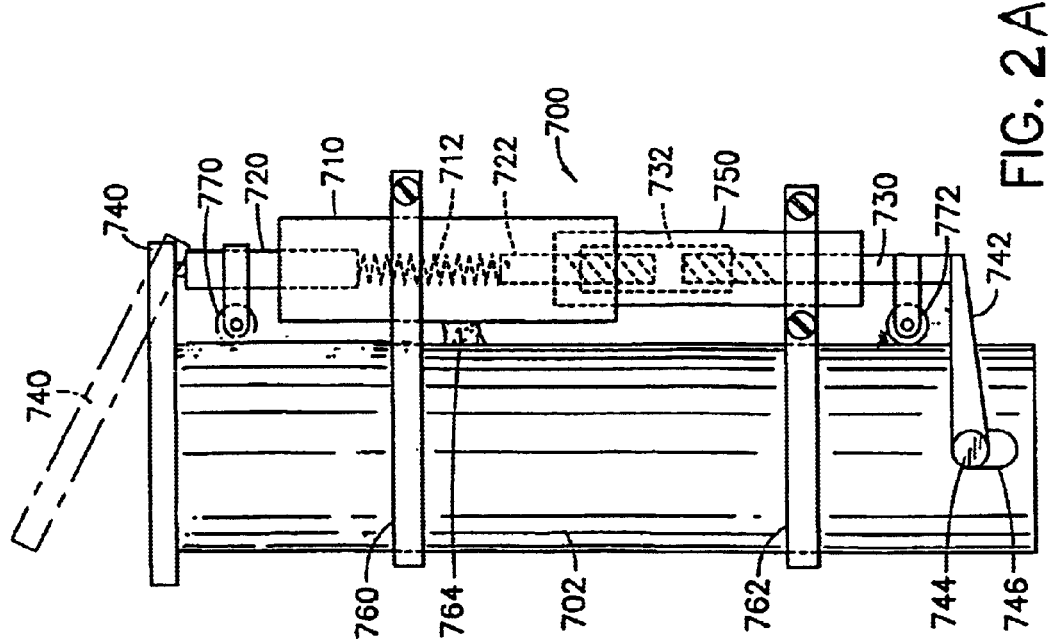

The ends of platform 232 are connected to one embodiment of an extension spring arrangement for use in a bicycle seat mount system that re-directs the downward force loading on 232 to an upper portion of a bicycle seat tube as shown in FIG. 2A.

FIG. 2A, generally indicated by the reference numeral 200, is a side elevational view, partially in cross section, that illustrates a preferred embodiment of a bicycle shock-absorbing seat mount constructed according to the present invention.

Extension spring arrangement 700 includes a first vertical tube 710 having disposed therein an extension spring 712. The upper end of extension spring 712 is attached to the lower end of a first rod 720 and the lower end of extension spring 712 is attached to the upper end of a second rod 722. The lower end of second rod 722 and the upper end of a third rod 730 are threadedly attached to a turnbuckle 732. The upper end of first rod 720 is attached to a collar 740 operatively fixedly disposed around an upper perimeter of bicycle seat tube 702, while the lower end of third rod 730 is attached to a yoke 742 which, in turn, is attached to the ends of support platform 744 that protrude through the wall of bicycle seat tube 702 through diametrically opposite vertical slots 746 (only one shown on FIG. 2A) which may be provided with a flexible cover. A second vertical tube 750 telescoping inserted into the lower end of first vertical tube 710 permits access to turnbuckle 732 for the adjustment thereof and provides for an adjustable total length of extension spring arrangement 700 that is suitable for emplacement along bicycle seat tube 702 of any originally manufactured bicycle. Upper and lower clamps 760 and 762, respectively, may be provided for the attachment of extension spring arrangement 700 to bicycle seat tube 702 and/or the arrangement may be attached by weld 764. Platform 744 movably supports a bicycle seat post and any ancillary components including biasing means which may be similar to those described above in FIG. 1. In any case, extension spring arrangement 700 re-directs a downward force loading on longitudinally movable support platform 744 to an upper portion of the bicycle and provides mechanical shock absorption. Upper and lower sliding means 770 and 772, respectively, may be provided between bicycle seat tube 702 and first and third rods 720 and 730 and may consist of rollers, wheels, low friction blocks or the like.

FIG. 2B is a frontal elevational view of the same components of extension spring 700 except weld 764 is not visible.

Figure 3:
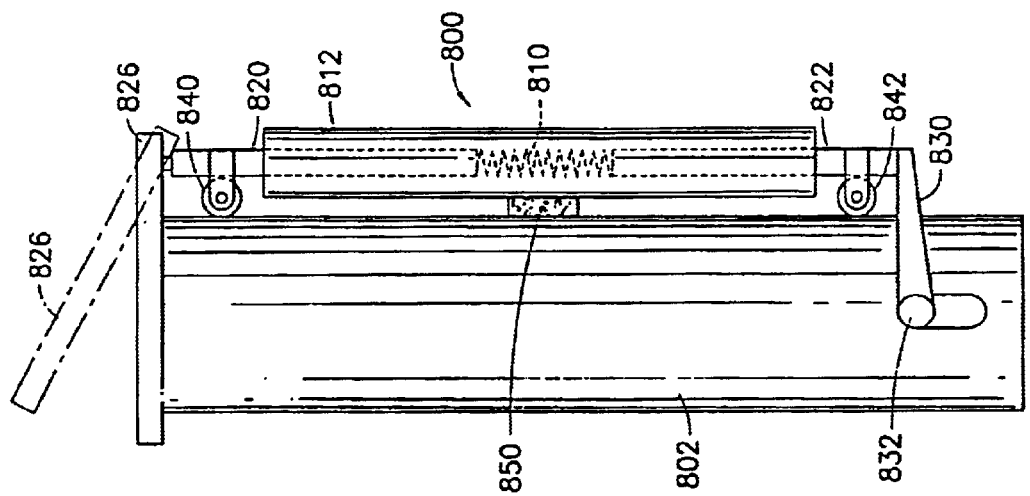
FIG. 3 is a side elevational view of another embodiment of an extension spring linkage apparatus for use in a bicycle seat mount shock-absorbing system.

FIG. 3 illustrates a more simplified extension spring arrangement, generally indicated by the reference numeral 800, as compared with extension spring arrangement 700 of FIGS. 2A and 2B. Extension spring arrangement 800 includes an extension spring 810 disposed in a vertical tube 812. The upper end of extension spring 810 is attached to the lower end of an upper rod 820, while the lower end of the extension spring is attached to the upper end of a lower rod 822. The upper end of upper rod 820 is attached to a collar 826 disposed around an upper perimeter of bicycle seat tube 802, while the lower end of lower rod 822 is attached to a yoke 830 which, in turn, is attached to the ends of support platform 832 that protrude through diametrically opposite openings in bicycle seat tube 802. Upper and lower sliding means 840 and 842 may be provided, respectively, between bicycle seat tube 802 and upper rod 820 and lower rod 822. Vertical tube 812 may be attached to bicycle seat tube 802 by means of a weld 850.

Extension spring arrangement 800 is applicable in OEM bike manufacture where the length of bicycle seat tube 802 is known and no adjustment of the total length of extension spring arrangement is required, as would be required for retrofitting in a variety of bicycle seat tube lengths.

Figure 4:
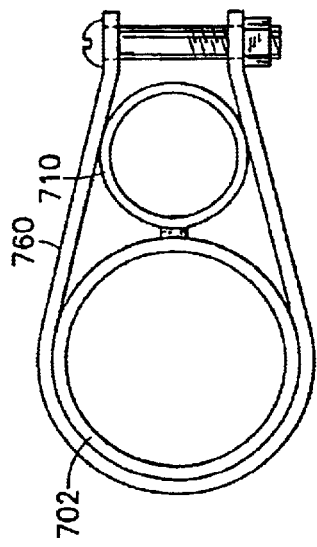
FIGS. 4 and 5 are examples of clamps that may be used to attach the extension spring linkage apparatus to a bicycle seat tube.
Figure 5:
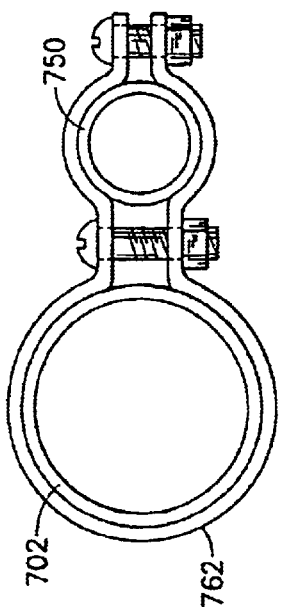

FIG. 4 illustrates in more detail, the components of upper clamp 760 attaching first tube 710 to bicycle seat tube 702 while FIG. 5 illustrates in more detail, the components of lower clamp 762 attaching second tube 750 to the bicycle seat tube.

Figure 6:
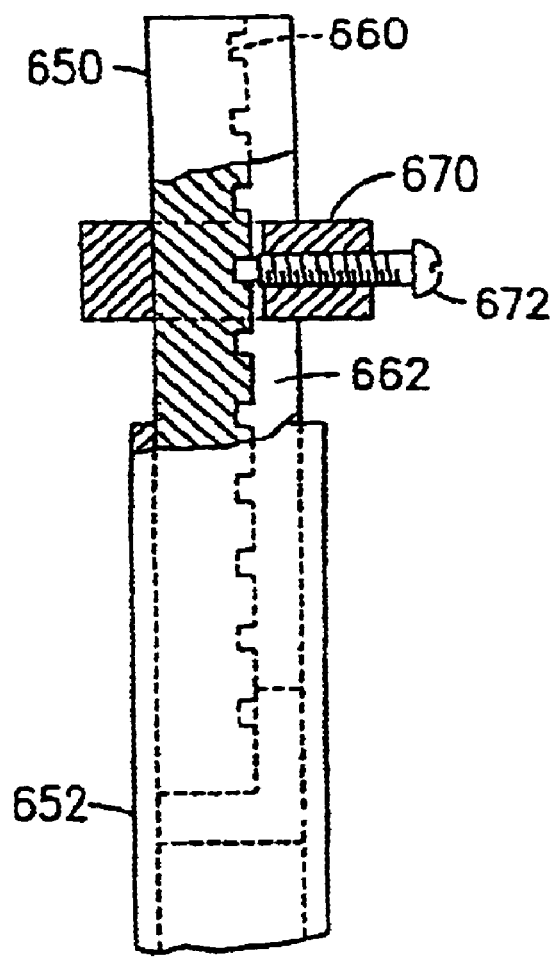
FIG. 6 illustrates means to prevent or limit downward motion of a bicycle seat post that is otherwise enabled to move longitudinally within a bicycle seat tube.

FIG. 6 illustrates means to manually prevent downward motion of a bicycle seat post (and an attched saddle) 650 at a selected elevation when inserted in a bicycle seat tube 652. A plurality of holes, as at 660, is defined in the inner surface of vertical slot 662. An annular collar 670 is disposed around bicycle seat post 650, the collar having a threaded fastener 672 inserted therethrough and into a selected one of indents 660, and the collar having dimensions such that it can rest on the top of bicycle seat tube 652 or any insert therein. Thus arranged, the minimum height of bicycle seat post 650 can be selectively fixed and further cushioning action disengaged.

Figure 7:
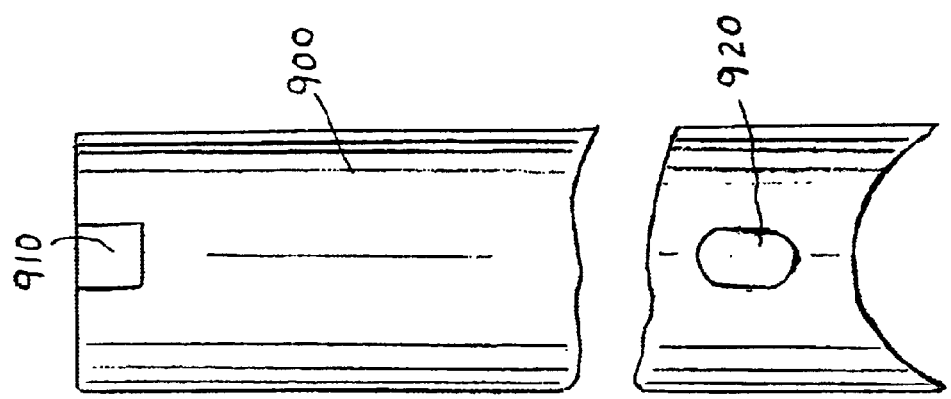
FIG. 7 is a side elevational view of a bicycle seat tube configured for insertion of a complementary shaped insert at it's top to prevent rotational motion of a shape conforming bicycle seat post and for axial movable outward extension of the seat post's support platform through openings in the seat tube wall.

FIG. 7 is a side elevational view of a bicycle seat tube 900 with notch cut-out 910 in it's upper perimeter for protrusion of a tab extending from the outer wall of a cylindrical, shape conforming insert (depicted as 220 and 240 respectively on FIG. 1) that prevents rotational motion of a seat post enclosed therein. Diametrically opposite, longitudinal, oblong slots 920 in a lower portion of seat tube 900 allow extension therethrough of a longitudinally movable seat post support platform.

Figure 8:
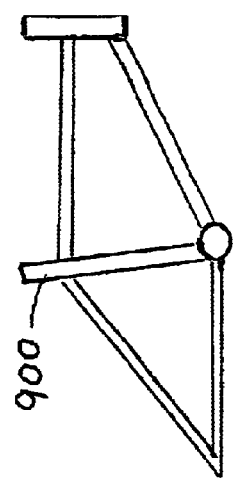
FIG. 8 is an illustration of a typical bicycle frame with it's seat tube identified.

FIG. 8 depicts a common bicycle frame with seat tube 900 identified.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objective set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limited sense.

It is also to be understood that the following claims are intended to cover all of the generic and specific features of the invention herein described and all statements of the scope of the invention which, as a matter of language, might be said to fall therebetween.

I claim:

1. A bicycle seat mount comprising:
   (a) a post fixedly attached to a bicycle seat at a proximal end of said post, a distal end of said post being inserted into a bicycle seat tube for axial movement therein;
   (b) first biasing means disposed within said seat tube to support said post and provide a cushioning action for said post and said bicycle seat by compression of said biasing means; and
   (c) second biasing means having first and second ends, with said first end operatively fixedly attached to the bicycle seat tube, and having said second end attached to an end of said first biasing means to provide a cushioning action for said post and said bicycle seat by extension of said second biasing means.

2. A bicycle seat mount system according to claim 1, wherein said seat tube comprises:
   (a) diametrically opposite openings in it's lower portion for protrusion of extended ends beyond said seat tube's outer wall, of an axial moveable, seat post supportive, platform disposed within the seat tube; and
   (b) a notch opening in the perimeter of an upper portion of the seat tube into which an extension of an element for restriction of rotational motion of said seat post may be inserted.

3. A bicycle seat mount system according to claim 1, wherein said seat post has a lengthwise slot defined in a surface thereof for a fixed complementary shape key protrusion therein such that said slot and said protrusion slidingly engage each other and prevent relative rotation between the seat post and the seat tube; a plurality of holes defined in an inner surface of the slot; a collar disposed around an outer periphery of the seat post and dimensioned so as to rest on an upper end of the seat tube or any insert flange top surface; and a transverse member inserted through said collar and into one of said holes to fix a minimum height of the bicycle seat post.

4. A bicycle seat mount comprising:
   (a) a post fixedly attached to a bicycle seat at a proximal end of said post, a distal end of said post being inserted into a bicycle seat tube for axial movement therein; and
   (b) biasing means disposed within said bicycle seat tube to support said post and provide a cushioning action for the post and said bicycle seat by compression of said biasing means; and
   (c) a platform disposed within the bicycle seat tube for support of the post and said biasing means; and
   (d) means mounted between said platform and the bicycle seat tube to redirect the downward force loading from the post on the platform to an upper portion of the bicycle seat.

5. A bicycle seat mount system according to claim 4, wherein said seat tube has diametrically opposite openings in it's lower portion for protrusion of extended ends of said platform beyond said seat tube's outer wall.

6. A bicycle seat mount comprising:
   (a) a post fixedly attached to a bicycle seat at a proximal end of said post, a distal end of said post being inserted into a bicycle seat tube for axial movement, therein; and
   (b) first biasing means disposed within said seat tube to support said post and provide cushioning action for said post and said bicycle seat by compression of said biasing means; and
   (c) a movable platform disposed within the seat tube for axial movement within defined limits therein for support of said post and said biasing means; and
   (d) second biasing means having first and second ends, with said first end operatively fixedly attached to the seat tube, and said second end attached to ends of said movable platform extended out of the seat tube to provide a cushioning action for the platform by extension of said second biasing means.

* * * * *